US009705590B2

(12) United States Patent
Chiu et al.

(10) Patent No.: US 9,705,590 B2
(45) Date of Patent: *Jul. 11, 2017

(54) JOINT IP/OPTICAL LAYER RESTORATION AFTER A ROUTER FAILURE

(71) Applicant: AT&T Intellectual Property II, L.P., Atlanta, GA (US)

(72) Inventors: Angela L. Chiu, Holmdel, NJ (US); John Lester Strand, Nashua, NH (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/693,160

(22) Filed: Apr. 22, 2015

(65) Prior Publication Data

US 2015/0229387 A1   Aug. 13, 2015

Related U.S. Application Data

(63) Continuation of application No. 11/401,264, filed on Dec. 13, 2005, now Pat. No. 9,042,720, which is a continuation of application No. 09/908,752, filed on Jul. 20, 2001, now abandoned.

(60) Provisional application No. 60/219,777, filed on Jul. 20, 2000.

(51) Int. Cl.
| | | |
|---|---|---|
| *H04Q 11/00* | (2006.01) | |
| *H04B 10/032* | (2013.01) | |
| *H04B 10/038* | (2013.01) | |
| *H04L 12/701* | (2013.01) | |
| *H04L 12/703* | (2013.01) | |
| *H04L 12/775* | (2013.01) | |

(Continued)

(52) U.S. Cl.
CPC .......... *H04B 10/038* (2013.01); *H04L 45/00* (2013.01); *H04L 45/28* (2013.01); *H04L 45/58* (2013.01); *H04L 45/62* (2013.01); *H04L 49/557* (2013.01); *H04Q 11/0062* (2013.01); *H04Q 11/0066* (2013.01); *H04Q 11/0071* (2013.01); *H04Q 2011/0064* (2013.01); *H04Q 2011/0081* (2013.01)

(58) Field of Classification Search
CPC ................................................. H04Q 11/0062
See application file for complete search history.

(56) References Cited

U.S. PATENT DOCUMENTS

| | | |
|---|---|---|
| 5,963,540 A | 10/1999 | Bhaskaran |
| 6,075,629 A | 6/2000 | Al-Salameh et al. |
| 6,148,411 A | 11/2000 | Ichinohe et al. |

(Continued)

OTHER PUBLICATIONS

J. Anderson et al., "Protocols and Architectures for IP Optical Networking", Bell Labs Technical Journal, Jan.-Mar. 1999.

(Continued)

*Primary Examiner* — Shi K Li

(57) ABSTRACT

A method and system for providing joint IP/Optical Layer restoration mechanisms for the IP over Optical Layer architecture, particularly for protecting against router failure within such architecture, includes any one of plural node elements participating in the detection and restoration of the joint IP/Optical Layer architecture upon the failure of a router in one of the nodes. The plural node elements may include, but are not limited to, one of plural routers and an optical cross-connect.

18 Claims, 6 Drawing Sheets

(51) Int. Cl.
   *H04L 12/721*   (2013.01)
   *H04L 12/939*   (2013.01)

(56) References Cited

U.S. PATENT DOCUMENTS

| | | |
|---|---|---|
| 6,304,346 B1 | 10/2001 | Sawada et al. |
| 6,400,477 B1 | 6/2002 | Wellbrook |
| 6,530,032 B1 | 3/2003 | Shew et al. |
| 6,724,757 B1 | 4/2004 | Zadikian et al. |
| 6,771,907 B1 | 8/2004 | Yoshifuji et al. |
| 6,813,241 B1 | 11/2004 | Wang et al. |
| 7,099,578 B1 | 8/2006 | Gerstel |
| 9,042,720 B2 * | 5/2015 | Chiu .................. H04L 45/00 398/2 |
| 2002/0018269 A1 | 2/2002 | Chaudhuri et al. |

OTHER PUBLICATIONS

"Telecommunication systems Engineering" by R. Freeman, John Wiley & Sons, 1980, pp. 99-103.

* cited by examiner

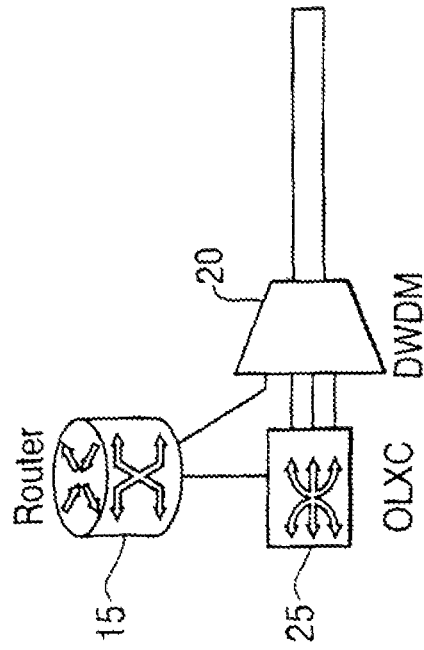
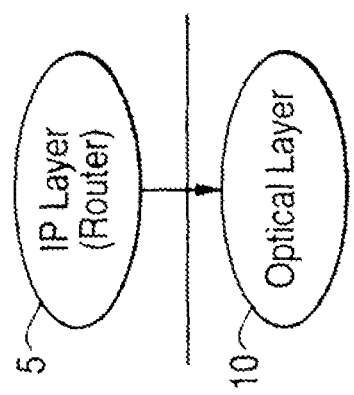
FIG. 1(a)
FIG. 1(b)

JOINT IP/OPTICAL LAYER RESTORATION AFTER A ROUTER FAILURE

RELATED APPLICATIONS

This application is a continuation of co-pending application Ser. No. 11/401,264, entitled "JOINT IP/OPTICAL LAYER RESTORATION AFTER A ROUTER FAILURE," filed Dec. 13, 2005, issued on May 26, 2015 as U.S. Pat. No. 9,042,720, which is a continuation of application Ser. No. 09/908,752, filed Jul. 20, 2001, now abandoned, which claims priority to Provisional Patent Application No. 60/219,777, filed on Jul. 20, 2000, now expired, the disclosure of each being incorporated in its entirety herein.

TECHNICAL FIELD

The disclosure generally relates to optical communications and particularly a method for the restoration of a joint IP optical layer after failure of a router therein.

BACKGROUND

With the Internet rapidly replacing traditional telephone networks as the ubiquitous network infrastructure, there is ever-increasing consumer demand for greater bandwidth, which translates to a need for increased system performance. Coping with the continuing high growth rate of Internet traffic volume is a significantly challenging scalability problem. Fiber optics using Wavelength Division Multiplexing (WDM) offers the enormous capacity that the Internet requires to continue to grow at its present and projected future rates. In addition, the increasing agility of the latest Optical Layer Cross-Connects (OLXCs) offers the ability to dynamically change the optical layer connectivity on small time scales. OLXCs have the ability to convert the wavelength of any incoming channel to any outgoing wavelength (i.e. have wavelength conversion).

Internet Protocol (IP) network connectivity is more often being provided by optical circuits, including OC-48/192, for example. Thus, FIG. 1(a) is a schematic diagram showing the connectivity of IP layer 5 to an optical layer 10. FIG. 1(b) shows a more specific schematic diagram in which IP router 15 may be either hard-wired to Dense Wave Division Multiplexer (DWDM) 20 for transport, or it may be connected to MAC 25.

There is an underlying conflict, however, between the typical datagram (connetionless) service that supports the best-effort data delivery of the Internet and virtual circuit (connection-based) service. This conflict is exacerbated in the world of optical networks, due to the fixed nature of the wavelengths available and the restoration of service in optical networks.

Optical networks are connection oriented and designed for fixed rate bit streaming with very low error rates. Whereas the Internet employs soft state where possible, the state of the optical infrastructure that is encoded in its OLXCs is hard and must be explicitly removed. The key elements in the success of the Internet have been its simplicity and the flexibility of the Internet service model, and therefore a significant challenge in leveraging the new optical capabilities to enhance the Internet and other services is to manage the optical resources efficiently, without sacrificing the simplicity and flexibility of the Internet.

In spite of most traffic and media types becoming internet protocol (IP) based, multiple-hop high-bandwidth optical connections referred to as lightpaths will continue to be of value. Aggregate loads between major metropolitan areas are rather stable, with most of the achievable statistical multiplexing already attained in the regional and collection (distribution) portion of the network. With electronic switching systems coping with substantial regional network volumes, this load can conveniently be assigned to point-to-point lightpaths that bypass intermediate backbone routers, reducing their load and reducing end-to-end delay and delay variation. Traffic engineering, i.e., load and quality management, is increasingly performed by adjusting connectivity and capacity between major backbone gateways on a relatively large time-scale, still small compared to the time-scale of provisioning.

This is both a primary function of and a significant reason that, ATM or Multi-Protocol Label Switching (MPLS) is employed below the IP layer by most network operators. Agile, dynamically configurable OLXCs allow the use of the optical layer directly to implement these functions, avoiding having ATM or MPLS as intermediate layers in future networks. Lightpaths carrying transit traffic, or non-IP traffic, may remain a significant source of revenue for network operators for the foreseeable future. Whereas much of the transit capacity may carry TIP traffic, operators leasing optical capacity may choose not to disclose this.

There are issues involving networks in general as they relate to where particular service and intelligence are provided. Functions previously provided by a SONET/SDH layer.

SONET (Synchronous Optical NETwork)/SDH (Synchronous Digital Hierachy) is an industry standard for broadband optical fiber communications. It provides universal optical interfaces at OC-N/STM-M rate. It also provides integrated OAM&P capabilities within each network element which enables fast protection/restoration. A good reference book is "Understanding SONET/SDH, Standards and Applications" by Ming-Chwan Chow, Andan Publisher, 1995.) interposed (not shown) above optical layer 10 must be distributed between IP layer 5 and Optical Layer 10 in the architecture of FIGS. 1(a) and 1(b), including the recovery of service after equipment failure.

Restoration may be provided by either the IP layer or the optical layer 10. The optical layer 10 is able to independently provide sub-second protection and/or restoration for link failures, that is when a fiber is cut, and is the most cost-effective solution therefore. However, when a router in the IP/Optical Layer architecture fails, the optical layer has no independent awareness of the router failure.

Thus, presently, it is the IP layer 5 that includes the necessary functionality for protecting against router failure. In addition, the IP layer 5 may include extra link capacity so that the quality of service may be preserved in the event of a router failure. As a result, it is then more cost-effective to use the extra link capacity to protect against link failure, and thus there is no incentive to utilize the protection/restoration function provided by the optical layer 10. Accordingly, IP network operators may choose a restoration strategy that depends solely upon the IP layer 5.

However IP layer restoration systems have some disadvantages. For instance, the failure of an unprotected link may result in mean-time-to-repair in the range of four to ten hours although mean-time-to-repair for a muter failure may be less than one hour. Still, the excessive amount of downtime due to a link failure may result in further router failures, which has the potential for significant network congestion.

SUMMARY OF THE INVENTION

Accordingly, the present invention includes a method and system for providing joint IP/Optical Layer restoration mechanisms for the IP over Optical Layer architecture, particularly for protecting against router failure within such architecture.

According to an example embodiment of the present invention, any one of plural node elements may participate in the detection and restoration of the joint IP/Optical Layer architecture upon the failure of a router in one of the nodes. The plural node elements may include, but are not limited to, one of plural routers and an optical cross-connect (OXLC).

For example, a node element may detect a failure in a lightpath to a node, transmit a request to an optical network to re-establish the lightpath, and reestablish the lightpath using a backup or redundant router in place of a failed router at the same node thereof.

All routers at the nodes are used during normal operations, though, for the purposes of this description, one router may be deemed to be "redundant" since it backs up traffic for another router that has failed at the same node. The node element that detects the failed router may include a router, disposed at another node, whereby the lightpath runs between the detecting router and the failed router; a redundant router at the same node as the failed router; or an OXC at the same node as the failed router.

If the muter failure is detected by a router, at either a remote node or at the same node as the failed muter, the detecting router transmits a request to an OXC at the respective node that the lightpath be re-established using the redundant router in place of the failed router. If the detecting router is at the remote node, the OXC at the remote node transmits the request to the OXC at the same node as the failed router.

Upon receiving the request for re-establishing the tailed lightpath by using the redundant router in place of the failed router, the OXC at the same node as the failed router coordinates the re-establishment of all links using the redundant router in place of the failed router. Also, the OXC at the same node as the failed router may also detect the failed router and re-establish links using the redundant router in place of the failed router.

BRIEF DESCRIPTION OF THE DRAWINGS

FIG. 1 shows a schematic diagram of a joint IP/Optical Layer architecture.

FIG. 1(b) shows a more detailed schematic diagram of a joint IP/Optical layer architecture, including the interconnection options therefore.

DETAILED DESCRIPTION OF THE INVENTION

Figure 2:
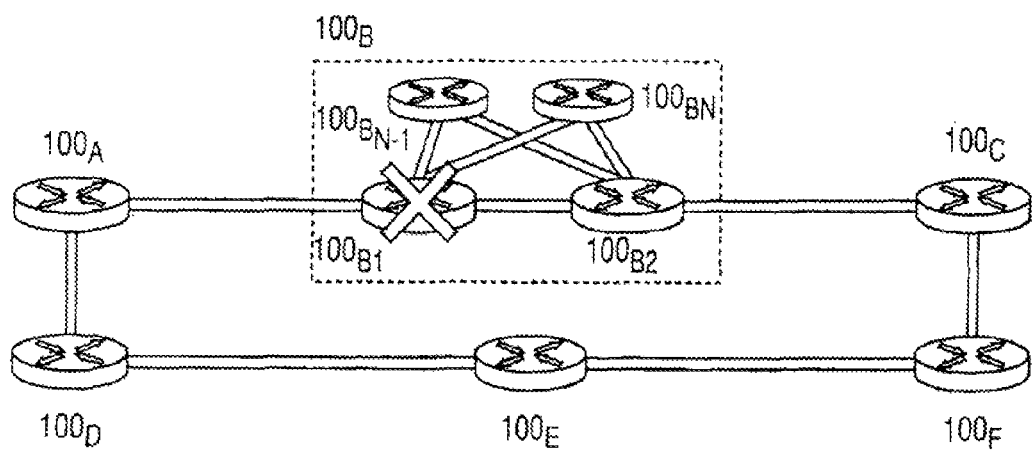
FIG. 2 shows an example IP architecture, as part of an example embodiment of the present invention, in which a router has failed.

As set forth above, FIG. 1(b) illustrates a joint IP/Optical Layer network node with the optical layer cross-connect (OLXC) 25 connected to DWDM 20, to thereby be connected to other OLXCs. The network node may further include IP router 15, along with dynamically-reconfigurable OLXC 25. Optical lightpaths may be established between network elements, via OLXCs, and the lightpaths serve as a virtual circuit.

In order to facilitate the description of the present invention the following network objects are defined.

A Wavelength Division Multiplexer (WDM) is a system that converts multiple optical inputs into narrowly spaced wavelength optical signals within an optical amplification band and couples them onto a single fiber. At the receiving end, the amplified signal may be de-multiplexed and converted to multiple channels of standard wavelength to interface with other equipment. It may also be possible to take the wavelength specific signals directly as the inputs. In that case, no wavelength conversion may be necessary at the WDM system. The WDM system may or may not be integrated with an OLXC.

A channel is a unidirectional optical tributary connecting two OLXCs. Multiple channels may be multiplexed optically at the WDM system. One direction of an OC-48/192 connecting two immediately neighboring OLXCs is an example of a channel. A single direction of an Optical channel (Och) as defined in ITU-T 0.872 between two OLXCs over a WDM system is another example of a channel. A channel may generally be associated with a specific wavelength in the WDM system. However, in a WDM system with transponders, the interfaces to the OLXC may be a standard single color (1310 or 1550 nm). Further, a single wavelength may transport multiple channels multiplexed in the time domain. For example, an OC-192 signal on a fiber may carry four STS-48 channels. For these reasons, a channel may be defined separately from wavelength although in most applications there is a one-to-one correspondence.

An optical layer cross-connect (OLXC) is a switching element that connects an optical channel from an input port to an output port. An OLXC may also be referred to as an optical cross-connect (OXC), and therefore shall be referred to as "OXC" hereafter.

A drop port is an OXC port that connects to the end client network element (NE). The drop interface may connect the client port to the OXC drop port. The OXC drop port is essentially a User Network Interface (UNI) that connects end devices the optical layer. The drop port terminates the user network interface between the client NE and the optical network. It is necessary to distinguish this type of interface from others to identify network requests originating from a client NE.

A network port is an OXC port that does not directly interface with an end client NE. A Network Port in an OXC interfaces with another Network Port via a WDM system or directly via optical fibers.

A lightpath is an abstraction of optical layer connectivity between two end points. A lightpath is a fixed bandwidth connection (e.g. one direction of a STM-N/OC-M payload or an Och payload) between two network elements (NEs) established via OXCs. A bidirectional lightpath includes two associated lightpaths in opposite directions routed over a same set of nodes.

A source may be a client router physically connected to an OXC by one or more OC-48/192 interfaces. A source may also be a non-IP NE connected to the OLXC via an OC-48/192 interface. In the case of an IP router source, the router may have an IP address, and the physical interfaces to the OXC are identified with some set of addresses (potentially a single IP address or a unique address per port). In the case of a non-IP NE, either the NE may be assigned an IP address, or the OLXC port connecting the NE may have an IP address. For non-IP aware equipment interfacing the OLXC, any connection request must be originated externally via a proxy or external OS interfaces. The destination is essentially the same as the source from the physical interface perspective. When a request is generated from one end, the other end client or end OXC interface may become the destination.

Figure 3:
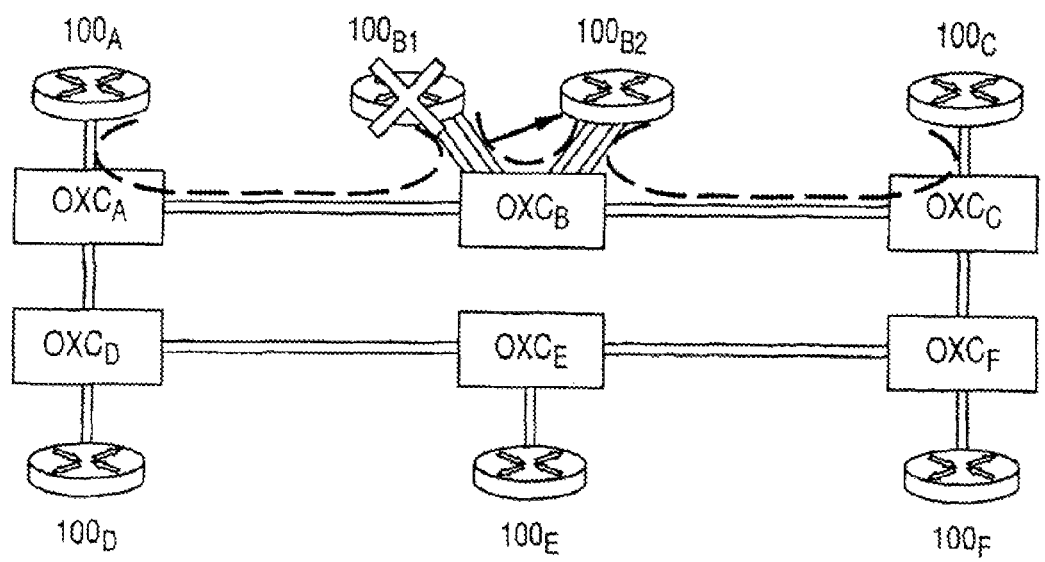
FIG. 3 shows an example of the IP over Optical Layer architecture, according to an example embodiment of the present invention, in which a router has failed.

A prominent feature of joint IP/Optical Layer network architecture according to an example embodiment of the present invention is that every office or node, A-F, in the network includes multiple, or redundant, IP routers $100_A$-$100_F$. and a dynamically reconfigurable OXC $200_A$-$200_N$, as shown in FIG. 3, although the present invention is in no way limited thereto. In FIG. 3, however, only office/node B is shown as having multiple routers $100_{B1}$-$100_{B2}$, though the present invention is not limited thereto. Rather, it is intended, in the present example embodiment of the invention, that all offices/nodes have multiple, or redundant, IP routers $100_N$.

Each IP office/node may be connected to other offices/nodes by one or more lightpaths. On each link within the network, one channel/wavelength is assigned as the default routed (one hop) lightpath. The routed lightpath may provide router-to-router connectivity over this link. These routed lightpaths may reflect (and are thus identical to) the physical topology. The assignment of this default lightpath is by convention, e.g. the "first" channel/wavelength. All traffic using this lightpath is IF traffic and is forwarded by the router.

As shown in FIG. 3, IP routers $100_N$ at the respective offices/nodes may communicate with their respective OXCs $200_N$ through a logical interface (not shown). The logical interface defines a set of basic primitives to configure the respective OXC $200_N$, and to enable the respective OXC $200_N$ to convey information to the respective router $100_N$. The mediation device translates the logical primitives to and from the proprietary controls of the OXC. A further embodiment may integrate the routers and their respective OXC into a single box or component and use a proprietary interface implementation, while still providing equivalent functionality to the interface described herein.

Beyond the node local mechanisms, signaling mechanisms may be required to construct optical lightpaths. An Application Programming Interface (API) call to create a path may require at least five parameters including: destination, wavelength, bandwidth, restoration flag, and a transparency flag. If the restoration flag is set, the lightpath will be protected. Lightpaths without the transparency flag are assumed to carry IP services, and may be rerouted if needed. On completion, an explicit tear down message is sent to remove the path.

Lightpath services may include lightpath requests between a source and destination, such as an API call with the following attributes:

As set forth above, restoration could be done at the IP layer 5 and/or the Optical Layer 10, as shown in FIG. 1(a). The present invention will be explained in the exemplary context of an ISP central office, using the schematic diagrams of FIGS. 2-4. The IP network of FIG. 2 includes, at each node therein, at least 2 backbone routers for redundancy, though the detailed office architecture is shown for office B only. These routers, $100_N$, aggregate all traffic to or from routers that connect to the customers of the network.

Under current IP routing systems, for example, when router $100_B$ at office/node B fails, IP traffic from office $100_A$ to $100_B$ would go around offices $100_D$, $100_E$, $100_F$, and $100_C$ to reach office $100_B$ via router $100_{B2}$, the backup router for $100_{B1}$. Similarly, traffic from office $100_A$ to $100_C$, which originally went through office $100_B$ would need to go around offices $100_D$, $100_E$, $100_F$, and $100_C$ to reach $100_C$. Additional capacity may therefore be needed on all the inter-office links.

Under current IP rerouting systems, for example, when router $100_B$, at office/node B fails, IP traffic from office $100_A$ to $100_B$ would go around offices $100_D$, $100_E$, $100_F$, and $100_C$ to reach office $100_B$ via router $100_{B2}$, the backup router for $100_{B1}$. Similarly, traffic from office $100_A$ to office $100_C$, which originally went through office $100_B$ would need to go around offices $100_D$, $100_E$, $100_F$, and $100_C$ to reach office $100_C$. Additional capacity may therefore be needed on all the inter-office links.

With the new IP over Optical Layer architecture shown in FIG. 3, according to an embodiment of the present invention, each office/node may be equipped with one OXC $200_N$, which connects to the two backbone routers $100_N$ and $100_{N2}$ at the same office/node. Then all the OXCs $200_N$ may be connected by a mesh topology. Links between routers are provided by direct lightpaths through the Optical Layer 10, which includes OXCs $200_N$. In FIG. 3 solid lines represent physical layer connectivity, and the dotted lines show the OC-48 links that may be used for the transport of packets between the routers at offices $100_N$ and to the neighboring offices.

In the restoration scheme according to an embodiment of the present invention, when router $100_{B1}$ at office B fails, bringing down both inter-office lightpath link between routers $100_A$ and $100_{B1}$ and the lightpath link between routers $100_{B1}$ and $100_{B2}$, router $100_A$ may detect that router $100_{B1}$ has failed and may request a new connection to be set up to the backup router, $R_{B2}$. Further, $OXC_B$ that connects to failed router $100_{B1}$ directly may detect the failure and coordinate the setup of the new lightpath link between routers $100_A$ and $100_{B2}$. This new link may use the same port for the failed link between routers $100_A$ and $100_B$ on router $100_A$, and either the same port for the failed lightpath link between routers $100_{B1}$ and $100_{B2}$ on router $100_{B2}$, or a spare port on router $100_{B2}$. In addition, the bandwidth originally used for the lightpath link between routers $100_A$ and $100_{B1}$ may be reused, as may the intra-office cabling from router $100_A$ to $OXC_A$ and the cabling from $OXC_9$ to $100_{B2}$. The restoration for router failures, described above, is implemented in a time period of a couple of seconds.

Figure 5:
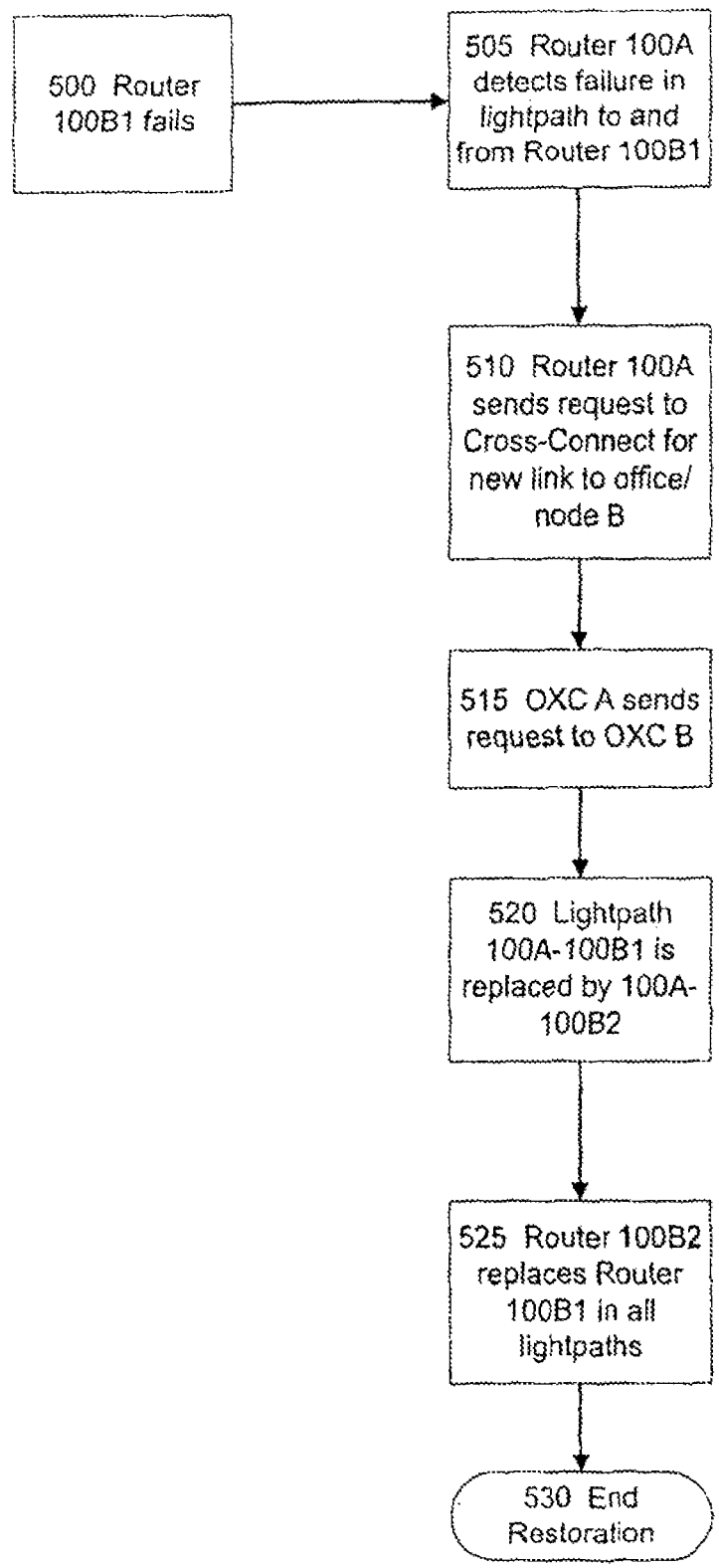
FIG. 5 is a flow chart showing an example method embodiment according to the present invention for a router at a remote node.

More specifically, as shown in FIG. 5, the failure of router $100_{B1}$ at office/node B (step 500) may be detected by router $100_A$ at office/node A, as in step 505. In step 510, router $100_A$ may send a request to $OXC_A$, also at node A, to restore the link between routers $100_A$ and $100_{B1}$ by setting up a new link (i.e., lightpath) between router $100_A$ and $100_{112}$. The signaling mechanism in the optical layer coordinates the lightpath establishment. The request may be transmitted from $OXC_A$ to other OXC's that are on the new lightpath, i.e., $OXC_B$ in this case in step 515, and may complete all necessary switching in $OXC_A$ to $OXC_B$ to establish the new lightpath. Then, in step 525, upon restoration of the lightpath links to office/node B, routing in the IP layer will automatically discover the new link between $100_A$ and $100_{B2}$, and router $100_{B1}$ may be replaced by router $100_B$, for all IP traffic through office/node B, and restoration may be complete at step 530.

Figure 6:
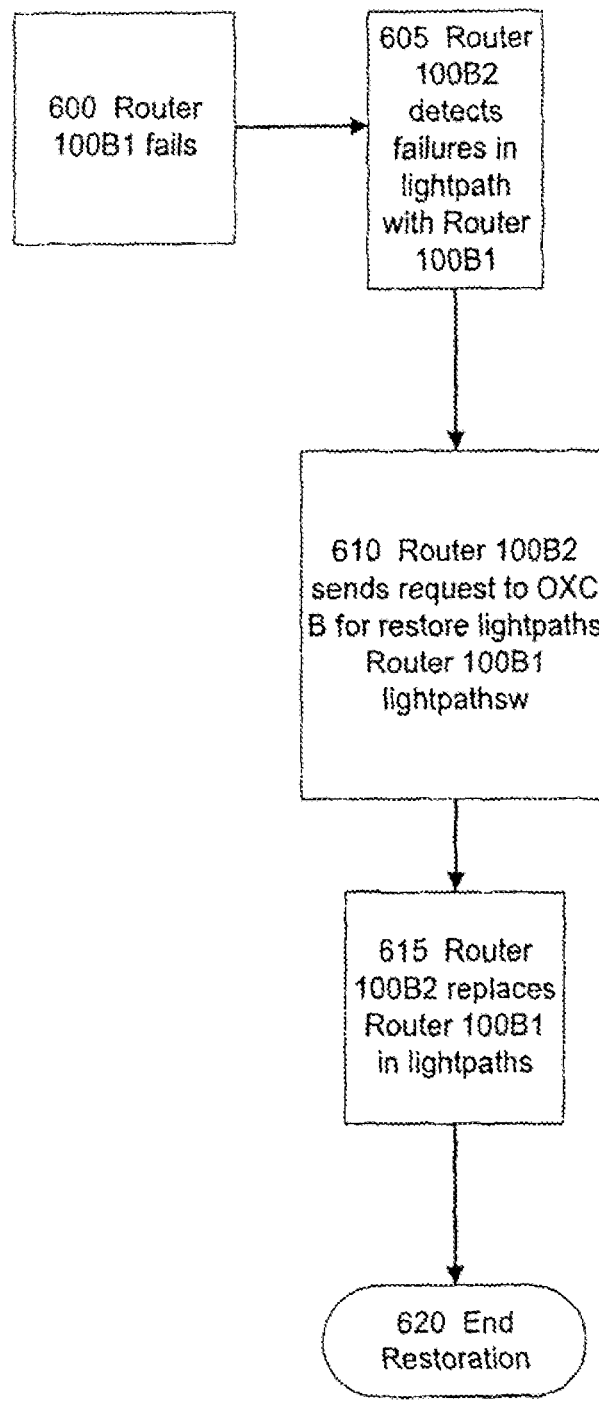
FIG. 6 is a flow chart showing an example method embodiment according to the present invention for a router at a home node.

The failure of router $100_{B1}$, at step 600, may also be detected by the redundant router $100_{B2}$, which is at the same node as the failed router, at step 605, as depicted in the flowchart in FIG. 6. In step 610, router $100_{B2}$ sends a request to $OXC_B$ that it connects to directly, also at node B, to restore the connection to office A by setting up a new lightpath link to routers $100_A$. In step 615, the signaling mechanism may forward the request from $OXC_B$ to $OXC_A$ to complete all necessary switching to establish the new lightpath. Then, in step 620, upon restoration of the lightpath link to office/node A, routing in the IP layer will may automatically discover the new link between $100_A$ and $100_{B2}$, and router $100_{B1}$ will be replaced by router $100_{B2}$ for all IP traffic through office/node B, and restoration may be complete at step 625.

Figure 7:
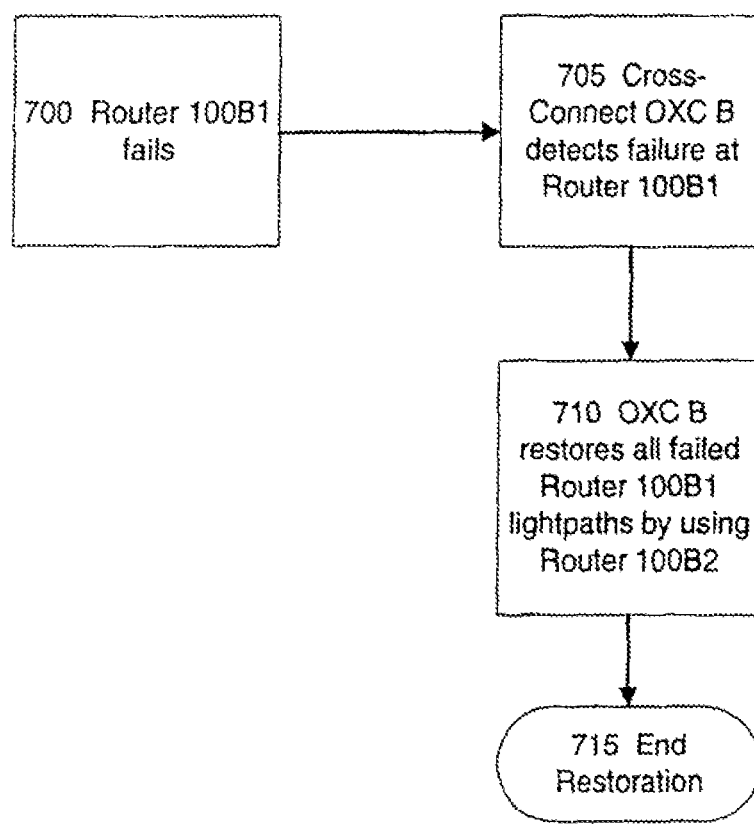
FIG. 7 is a flow chart showing an example method embodiment according to the present invention for an optical cross-connect at a home node.

Further, as shown in the flowchart of FIG. 7, the failure of router $100_{B1}$, at step 700, may be detected by the cross-connect $OXC_B$, which is disposed at the same office/node B as the failed router $100_{B1}$ as in step 705. Since $OXC_B$ controls connections for all routers at node B, in step 710, $OXC_B$ may restore all inter-office links associated with failed router $100_{B1}$ with router $100_{B2}$ via the signaling mechanisms, thus ending restoration at step 715.

Figure 4:
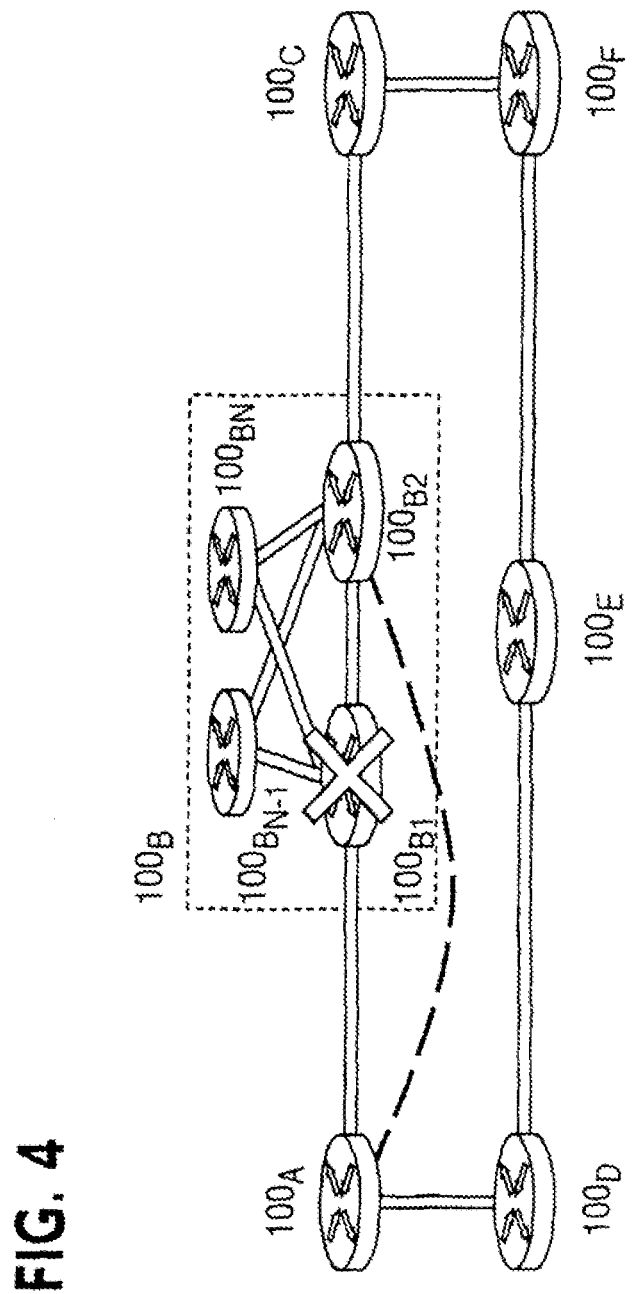
FIG. 4 shows an example IP architecture, as part of an example embodiment of the present invention, in which a path has been re-routed after a router has failed.

The IP layer topology resulting from the restoration described in accordance with the example method embodiments of FIGS. 5-7 above is shown in FIG. 4. As a result of the restoration implementation described above, lightpath traffic, as shown in FIG. 4, may utilize lightpath link from router $100_A$ to router $100_{B2}$ using the same number of hops with no additional backbone capacity required.

As set forth above, intra-office capacity from cross-connect $OXC_B$ to router $100_{B2}$, for example, that was formerly used for the intra-office link between routers $100_{B1}$ and $100_{B2}$ may be reused. Both intra-office lightpath links may require the same amount of additional intra-office capacity from the backup router $100_{B2}$ to all provider edge routers. With the restoration scheme described above, lightpath traffic between router $100_A$ and router $100_C$, via router $100_B$, now may use the new link between router $100_A$ and router $100_{B2}$, with one intra-office hop less than an original path to go across office B and with no additional backbone capacity required. In comparison, IP rerouting would send the traffic via another route, thus potentially requiring additional backbone link capacity and very likely increasing the hop count.

Thus, in this example restoration against the failure of router $100_{B1}$ has been achieved with no requirement for additional backbone bandwidth, OXC ports, or router ports.

In other cases with different topology, additional ports may be required on the backup router. For example, if one more backbone link is added to router $100_{B1}$ in the original network shown in FIG. 2, for example a lightpath link between routers $100_E$ and $100_{B1}$, in addition to restoring the lightpath link between routers $100_A$ and $100_{B1}$ using the new lightpath link between routers $100_A$ and $100_{B2}$, the lightpath link between routers $100_E$ and $100_{B1}$ may be replaced by new lightpath link between routers $100_E$ and $100_{B2}$. Since there is only one port on router $100_{B2}$, e.g., the port used by the failed intra-office lightpath link, between routers $100_B$ and $100_{B2}$, reusable taken by the lightpath link between routers $100_A$ and $100_{B2}$, an port may be required on router $100_{B2}$ for the further required lightpath link between routers $100_E$ and $100_{B2}$. In general, the minimum number of additional ports needed on the backup router equals the total number of inter-office links on the failed router reduced by the number of re-usable ports (i.e., same type of ports) on the backup router that can be used by the failed intra-office links between the failed router and its backup router.

After a router failure is repaired, it is desirable to revert back to the normal connections. We describe the details in the following three cases:

No Re-Use of the Wavelength(s) and Port(s) of the Replaced Lightpath

When a neighbor of the failed router detects that the failure has been repaired, it may first request the replaced lightpath to here-established using the original wavelength(s) and port(s). After the original lightpath has been restored, it may then request the recovery lightpath to be torn down. This case results in minimum interruption of the traffic.

Re-Use of the Wavelength(s) without the Re-Use of the Port(s) of the Replaced Lightpath When a neighbor of the failed router detects that the failure has been repaired, it may first request the replaced lightpath to be re-established using the original port(s) and new wavelength(s) if feasible. After the replaced lightpath has been restored, it may then request the recovery lightpath to be torn down. However, if additional wavelength(s) are not available or if it is required to revert back to the same wavelength(s) as the one(s) used in the normal condition, the recovery lightpath may need to be torn down first before the original one gets restored using the original port(s) and wavelength(s). This may result in some traffic loss during the reversion process.

Re-Use of the Wavelength(s) or Port(s) of the Replaced Lightpath

When a neighbor of the failed router detects that the failure has been repaired, it may first request the replaced lightpath to be re-established using new port(s) and wavelength(s) if feasible. After the replaced lightpath has been restored, it may then request the recovery lightpath to be torn down. However, if additional wavelength(s) or port(s) is not available or if it is required to revert back to the same port(s) and wavelength(s) as the ones used in the normal condition, the recovery lightpath needs to be torn down first before the original one gets restored using the original port(s) and wavelength(s). This may result in some traffic loss during the reversion process.

Note that the restoration mechanisms proposed here are applicable to failure restoration for router interfaces. It is also applicable to cases without backup routers in the same office. Instead, a router in a neighboring office can be used as the backup router.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for restoring Internet protocol service after failure of a first Internet protocol layer router located in a first network office, the first network office including a first optical layer element connected directly with the first Internet protocol layer router, the method comprising:

by the first optical layer element, detecting the failure of the first Internet protocol layer router; and by the first optical layer element, transmitting a request to a second optical layer element in a second network office to coordinate replacement of a link for Internet protocol traffic to the failed first Internet protocol layer router with a new link for Internet protocol traffic to a redundant Internet protocol layer router co-located in the first network office, the new link to the redundant Internet protocol layer router using an inter-office optical connection between the first optical layer element and the second optical layer element.

2. The method of claim 1, wherein transmitting a request to coordinate replacement of a link to the failed first Internet protocol router with a new link further comprises:
transmitting the request to coordinate replacement of the link to the failed first Internet protocol router with a new link that uses a port on a second Internet protocol layer router in the second network office formerly used in a link between the second Internet protocol layer router and the failed first Internet protocol layer router.

3. The method of claim 1, wherein transmitting a request to coordinate replacement of a link to the failed first Internet protocol router with a new link further comprises:
transmitting the request to coordinate replacement of the link to the failed first Internet protocol router with a new link that uses a spare port on the redundant Internet protocol layer router.

4. The method of claim 1, wherein transmitting a request to coordinate replacement of a link to the failed first Internet protocol router with a new link further comprises:
transmitting the request to coordinate replacement of the link to the failed first Internet protocol router with a new link that uses a port on the redundant Internet protocol layer router formerly used in a link between the failed first Internet protocol layer router and the redundant Internet protocol layer router.

5. The method of claim 1, wherein the first optical layer element controls connections for multiple Internet protocol layer routers located in the first network office.

6. The method of claim 1, wherein transmitting a request to the second optical layer element to coordinate replacement of the link further comprises transmitting instructions to use an application programming interface call to create the link.

7. A computer-readable storage device having stored thereon computer readable instructions for restoring Internet protocol service after failure of a first Internet protocol layer router located in a first network office, the first network office including a first optical layer element connected directly with the first Internet protocol layer router, wherein execution of the computer readable instructions by a processor of the first optical layer element causes the first optical layer element to perform operations comprising:
detecting the failure of the first Internet protocol layer router; and
transmitting a request to a second optical layer element in a second network office to coordinate replacement of a link for Internet protocol traffic to the failed first Internet protocol layer router with a new link for Internet protocol traffic to a redundant Internet protocol layer router co-located in the first network office, the new link to the redundant Internet protocol layer router using an inter-office optical connection between the first optical layer element and the second optical layer element.

8. The computer-readable storage device of claim 7, wherein transmitting a request to coordinate replacement of a link to the failed first Internet protocol router with a new link further comprises:
transmitting the request to coordinate replacement of the link to the failed first Internet protocol router with a new link that uses a port on a second Internet protocol layer router in the second network office formerly used in a link between the second Internet protocol layer router and the failed first Internet protocol layer router.

9. The computer-readable storage device of claim 7, transmitting a request to coordinate replacement of a link to the failed first Internet protocol router with a new link further comprises:
transmitting the request to coordinate replacement of the link to the failed first Internet protocol router with a new link that uses a spare port on the redundant Internet protocol layer router.

10. The computer-readable storage device of claim 7, wherein transmitting a request to coordinate replacement of a link to the failed first Internet protocol router with a new link further comprises:
transmitting the request to coordinate replacement of the link to the failed first Internet protocol router with a new link that uses a port on the redundant Internet protocol layer router formerly used in a link between the failed first Internet protocol layer router and the redundant Internet protocol layer router.

11. The computer-readable storage device of claim 7, wherein the first optical layer element controls connections for multiple Internet protocol layer routers located in the first network office.

12. The computer-readable storage device of claim 7, wherein transmitting a request to the second optical layer element to coordinate replacement of the link further comprises transmitting instructions to use an application programming interface call to create the link.

13. A system comprising:
a first network office including a first Internet protocol layer router, a redundant Internet protocol layer router and a first optical layer element, the first optical layer element being connected directly with the first Internet protocol layer router;
the first optical layer element comprising a processor and a memory containing instructions that, when executed by the processor, cause the processor to detect a failure of the first Internet protocol layer router, and to transmit a request to a second optical layer element in a second network office to coordinate replacement of a link for Internet protocol traffic to the failed first Internet protocol layer router with a new link for Internet protocol traffic to the redundant Internet protocol layer router, the new link to the redundant Internet protocol layer router being via an inter-office optical connection between the first optical layer element and the second optical layer element.

14. The system of claim 13, wherein the memory of the first optical layer element further contains instructions to transmit a request to coordinate replacement of the link to the failed first Internet protocol router with a new link that uses a port on a second Internet protocol layer router in the second network office formerly used in a link between the second Internet protocol layer router and the failed first Internet protocol layer router.

15. The system of claim 13, wherein the memory of the first optical layer element further contains instructions to transmit a request to coordinate replacement of the link to the failed first Internet protocol router with a new link that uses a spare port on the redundant Internet protocol layer router.

16. The system of claim 13, wherein the memory of the first optical layer element further contains instructions to transmit a request to coordinate replacement of the link to the failed first Internet protocol router with a new link that uses a port on the redundant Internet protocol layer router formerly used in a link between the failed first Internet protocol layer router and the redundant Internet protocol layer router.

17. The system of claim 13, wherein the memory of the first optical layer element further contains instructions to control connections for multiple Internet protocol layer routers located in the first network office.

18. The system of claim 13, wherein the memory of the first optical layer element further contains instructions to transmit instructions to use an application programming interface call to create the link.

* * * * *